US010294772B2

(12) United States Patent
Hill et al.

(10) Patent No.: US 10,294,772 B2
(45) Date of Patent: May 21, 2019

(54) CIRCUMFERENTIAL ARRAY BOREHOLE EVALUATION TOOL

(71) Applicant: Halliburton Energy Services, Inc., Houston, TX (US)

(72) Inventors: Jim T. Hill, Kingwood, TX (US); Philip E. Fox, Covington, LA (US); Arthur Chuen Hon Cheng, Houston, TX (US); Philip William Tracadas, West University Place, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 85 days.

(21) Appl. No.: 15/127,992

(22) PCT Filed: Apr. 22, 2014

(86) PCT No.: PCT/US2014/034912
§ 371 (c)(1),
(2) Date: Sep. 21, 2016

(87) PCT Pub. No.: WO2015/163852
PCT Pub. Date: Oct. 29, 2015

(65) Prior Publication Data
US 2017/0107809 A1 Apr. 20, 2017

(51) Int. Cl.
*G01V 1/46* (2006.01)
*G01V 1/52* (2006.01)
(Continued)

(52) U.S. Cl.
CPC .......... *E21B 47/0005* (2013.01); *G01V 1/345* (2013.01); *G01V 1/46* (2013.01);
(Continued)

(58) Field of Classification Search
CPC . G01V 1/52; G01V 1/345; G01V 1/46; G01V 1/306; E21B 47/0005; E21B 33/14
(Continued)

(56) References Cited

U.S. PATENT DOCUMENTS 3,729,705 A 4/1973 Grijalva
4,703,459 A * 10/1987 Bower ................. E21B 43/119
181/104

(Continued)

FOREIGN PATENT DOCUMENTS

CN 101392646 A 5/2009

OTHER PUBLICATIONS

International Preliminary Report on Patentability issued in related Application No. PCT/US2014/034912, dated Nov. 3, 2016 (10 pages).

(Continued)

Primary Examiner — Daniel L Murphy
(74) Attorney, Agent, or Firm — Benjamin Fite; Baker Botts L.L.P.

(57) ABSTRACT

An example apparatus for downhole cement inspection may include a tool body and an acoustic transmitter coupled to the tool body. An acoustic receiver may be coupled to the tool body at a first distance from the acoustic transmitter. A first array of acoustic receivers may be coupled to and positioned around a circumference of the tool body at a second distance from the acoustic transmitter. The second distance may be greater than the first distance. The acoustic receiver may be one receiver of a second array of acoustic receivers coupled to and positioned around the circumference of the tool body at the first distance. The first distance may be approximately three feet and the second distance may be approximately five feet.

11 Claims, 4 Drawing Sheets

(51) Int. Cl.
*E21B 47/00* (2012.01)
*G01V 1/34* (2006.01)
*E21B 33/14* (2006.01)
*G01V 1/30* (2006.01)

(52) U.S. Cl.
CPC ............... *G01V 1/52* (2013.01); *E21B 33/14* (2013.01); *G01V 1/306* (2013.01)

(58) Field of Classification Search
USPC .......................................................... 367/86
See application file for complete search history.

(56) References Cited

U.S. PATENT DOCUMENTS

| | | |
|---|---|---|
| 4,805,156 A | 2/1989 | Attali et al. |
| 4,896,303 A | 1/1990 | Leslie et al. |
| 5,089,989 A | 2/1992 | Schmidt et al. |
| 6,614,360 B1 | 9/2003 | Leggett, III et al. |
| 2003/0156494 A1 | 8/2003 | McDaniel et al. |
| 2009/0185445 A1 | 7/2009 | Yogeswaren et al. |
| 2011/0149684 A1* | 6/2011 | Hurst ...................... G01V 1/46 367/34 |

OTHER PUBLICATIONS

E.R. Crain, Crain's Petrophysical Handbook, http://www.spec2000.net/07-cementlog2.htm.

Tetratec, Segmented Radial Cement Bond Logging, http://www.tetratec.com/Products_and_Services/Electric_Wireline/Segmented_Radial_Cement_Bond_Logging.aqf.

General Electric Co., Ultrawire Radial Bond Tool, http://www.ge-energy.com/content/multimedia/_files/downloads/GEA18984_Radial%20Bond%20Tool%20Fact%20sheet_r2.pdf.

International Search Report and Written Opinion issued in related PCT Application No. PCT/US2014/034912 dated Jan. 21, 2015, 13 pages.

Supplementary European Search Report issued in related PCT Application No. PCT/US2014034912, dated Oct. 26, 2017, 8 pages.

* cited by examiner

US 10,294,772 B2

CIRCUMFERENTIAL ARRAY BOREHOLE EVALUATION TOOL

CROSS-REFERENCE TO RELATED APPLICATION

The present application is a U.S. National Stage Application of International Application No. PCT/US2014/034912 filed Apr. 22, 2014, which is incorporated herein by reference in its entirety for all purposes.

BACKGROUND

Well drilling and completion operations typically require the use of casings within a borehole in a subterranean formation to ensure that the borehole does not collapse once it is drilled and that sensitive areas of the formation are protected and isolated. In most cases the casings are secured in the borehole using a cement layer that fills an annulus between and bonds to both the casing and the formation. The strength of both cement bonds are important to the integrity of the well.

FIGURES

Some specific exemplary embodiments of the disclosure may be understood by referring, in part, to the following description and the accompanying drawings.

Figure 1:
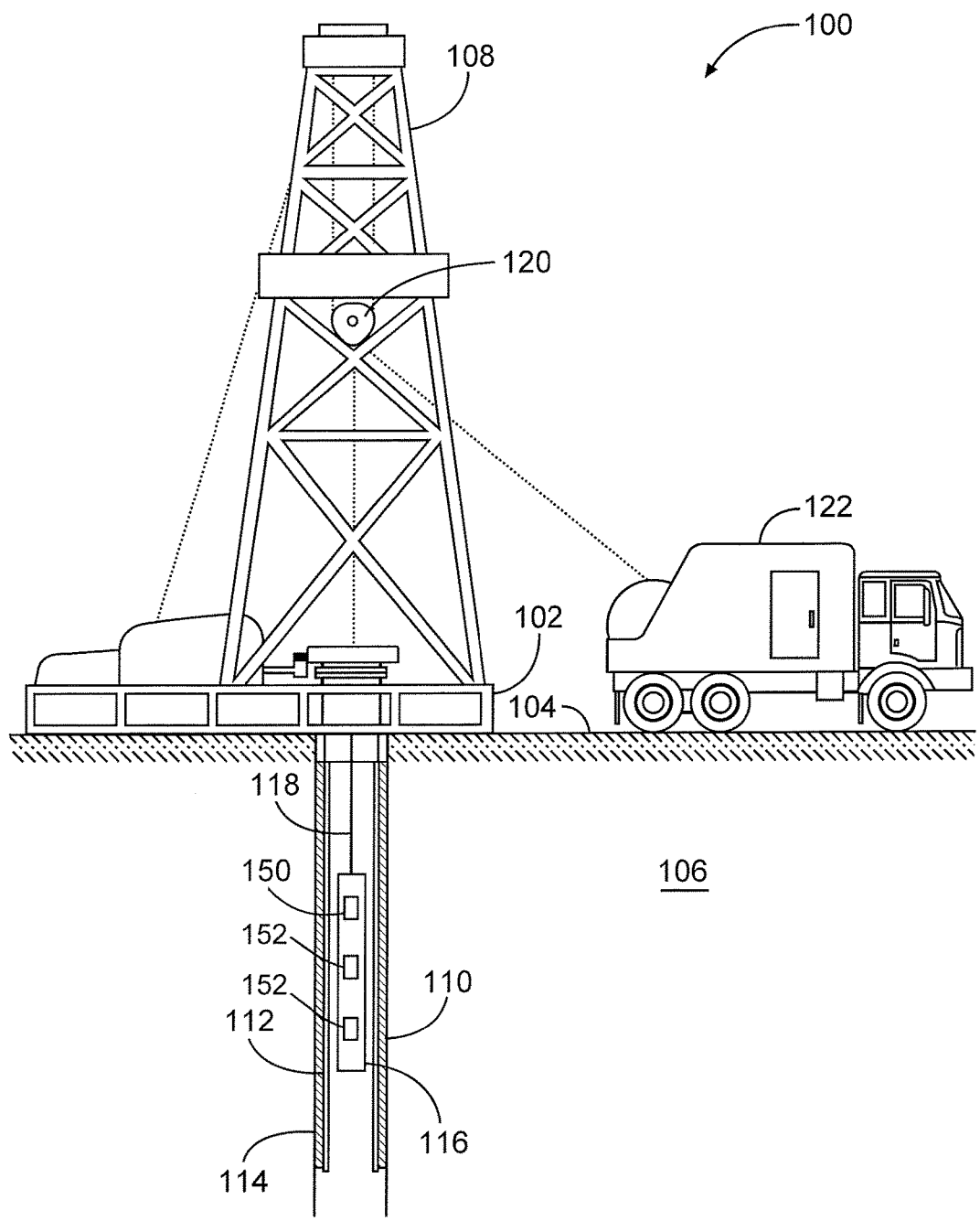
FIG. 1 is a diagram showing an example well drilling and completion system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

FIG. 1 is a diagram of a subterranean drilling system 100, according to aspects of the present disclosure. The system 100 comprises a drilling platform 102 positioned at the surface 104. In the embodiment shown, the surface 104 comprises the top of a formation 106 containing one or more rock strata or layers, and the drilling platform 102 may be in contact with the surface 104. In other embodiments, such as in an off-shore drilling operation, the surface 104 may be separated from the drilling platform 102 by a volume of water.

The system 100 may include a rig 108 mounted on the drilling platform 102, positioned above a borehole 110 within the formation 106. The borehole 110 may be created through a subterranean drilling process in which a drill bit (not shown) is rotated within the formation 106. As the borehole 110 is extended, one or more pipes or casings may be inserted into and secured within the borehole 110. In the embodiment shown, a single casing 112 is secured within the borehole 110 via a cement layer 114 that substantially fills the annulus between the casing 112 and the borehole 110. The casing 112 may comprise a metal tubular with a pre-determined length and diameter that is specifically selected for a particular depth in the formation 106. Although only one casing 112 is shown in FIG. 1, multiple casings may be used, including in a telescopic orientation where casings with progressively smaller diameters are used as the borehole 110 extends further into the formation 106. The casing 112 may prevent the borehole 110 from collapsing, prevent sensitive formation strata from exposure to downhole fluids, and prevent unwanted formation fluids from entering the borehole 110.

The system 100 further may include a downhole tool 116 that is positioned within the borehole 110 and casing 112 and includes one or more transmitters 150 and receivers 152 to perform measurement/logging operations. In the embodiment shown, the downhole tool 116 comprises a wireline tool that is suspended within the borehole 110 and casing 112 via a cable 118 and a hook 120. The cable 118 may comprise wireline, slickline, coiled tubing, etc. The downhole tool 116 may be communicatively coupled a logging facility 122 by the cable 118. The logging facility 122 (shown as a truck, although it may be any other structure) may collect measurements from the downhole tool 116, and may include computing facilities (including, e.g., an information handling system) for controlling, processing, storing, and/or visualizing the measurements gathered by the downhole tool 116 and communicated to the computing facilities through the cable 18. Controlling the operation of the downhole tool 116 may comprise sending control signals to cause the downhole tool 116 to take measurements. Although the computing facilities are described above with respect to the logging facility 122, freestanding computing facilities and/or information handling systems may be used to control, process, store, and/or visualize the measurements gathered by the downhole tool 116.

Figure 2:
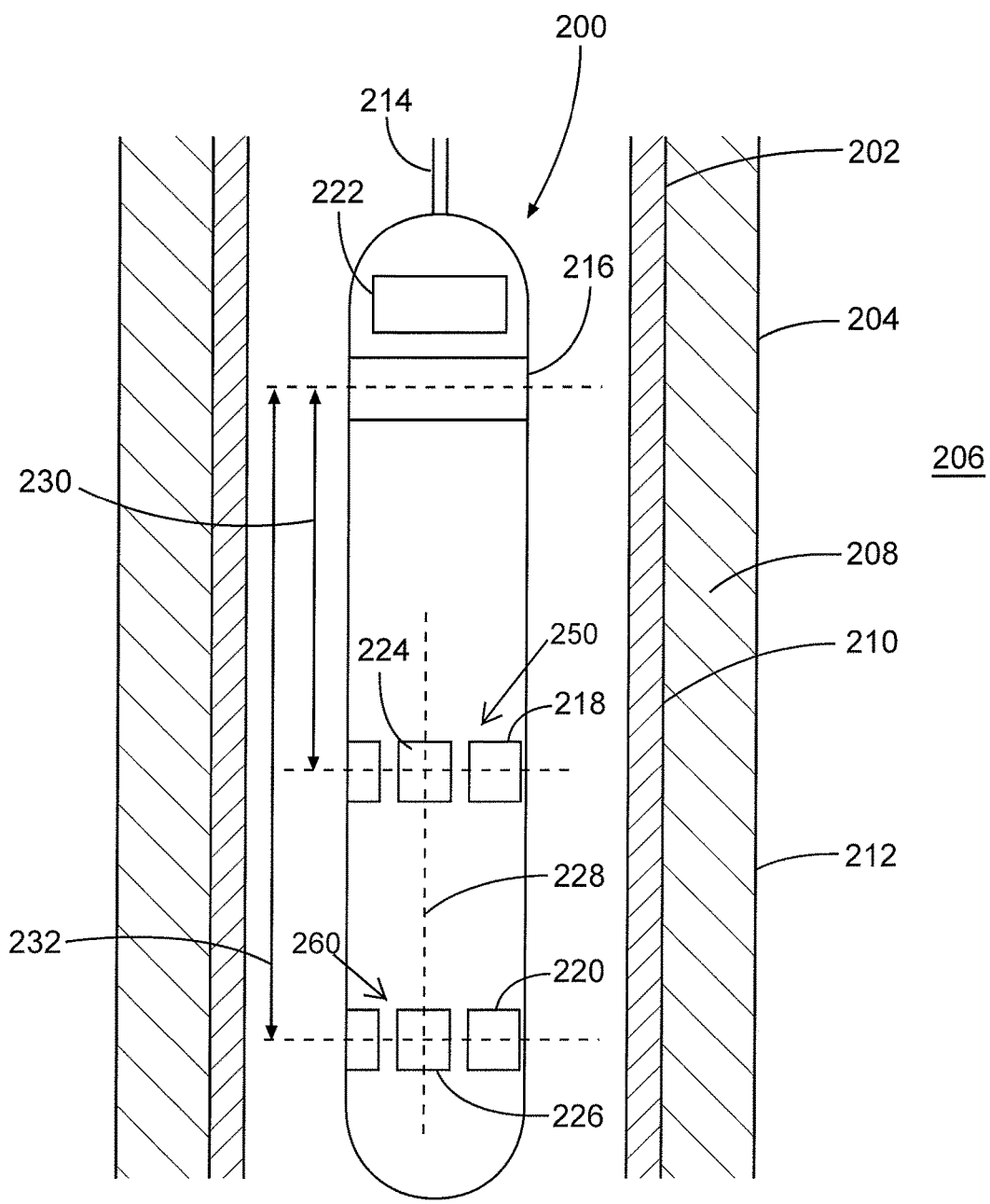
FIG. 2 is a diagram of an example downhole tool positioned within a casing and a borehole in a formation, according to aspects of the present disclosure.

According to aspects of the present disclosure, the downhole tool 116 may be used to evaluate the borehole 110 and, specifically, the cement layer 114 between the casing 112 and the borehole wall 110. FIG. 2 is a diagram of an example downhole tool 200 positioned within a casing 202 and a borehole 204 in a formation 206, according to aspects of the present disclosure. Like the downhole tool described above, the tool 200 may be suspended in the casing 202 and borehole 204 by a cable 214. The casing 202 may be secured within the borehole 204 by a cement layer 208. Specifically, the cement layer 208 may secure the casing 202 within the borehole 204 by forming a first bond 210 with the casing 202 and a second bond 212 with the formation 206 at the wall of the borehole 204.

The tool 200 may comprise a transmitter 216, a first receiver 218, a second receiver 220, and an electronics module 222 that is communicably coupled to the transmitter 216, the first receiver 218, and the second receiver 220. The transmitter 216 may comprise an acoustic source that transmits sonic or ultrasonic pressure pulses into the casing 202, cement layer 204, and formation 206. The first receiver 218 and second receiver 220 may comprise acoustic receivers, such as piezoelectric sensors, that receive the reflected pressure pulses and generate an electric charge or potential that corresponds to the amplitude of the received pressure pulses. In certain embodiments, one or more of the transmitter 216, first receiver 218, and second receiver 222 may comprise an acoustic transducer that can transmit and/or receive pressure pulses. The electronics module 222 may control the transmission of the pressure pulses, receive and record the electric charges or potentials from the first receiver 218 and second receiver 220, and transmit the measurements to an information handling system (not shown) positioned at the surface using the cable 214.

The transmitter 216 may comprise an omnidirectional acoustic source that wraps around the circumference of the tool 200 and transmits pressure pulses in all radial directions with respect to a longitudinal axis of the tool 200. In other embodiments, an array of acoustic sources circumferentially positioned around the tool 200 may be used. The first receiver 218 may comprise one receiver of a first circumferential array of receivers 250, with each receiver of the circumferential array 250 being positioned at a different angular orientation around the circumference of the tool 200. Similarly, the second receiver 220 may comprise one receiver of a second array of circumferential receivers 260. In the embodiment shown, the receivers of the first circumferential array 250 and second circumferential array 260 are arranged around the circumference of the tool at equal angular intervals. In certain embodiments, each of the receivers of the circumferential arrays of receivers 250 and 260 may comprise a separate acoustic receiver, such as a piezoelectric sensor.

Each receiver of the arrays of receivers 250 and 260 may be sensitive to and measure reflected pressure pulses in a particular radial direction or range of radial directions. As will be described below, the resulting measurements may be used to generate a log or visualization that can be used to identify characteristics of the cement layer 208 at unique radial positions with respect to the tool 200. This is in contrast to an omnidirectional receiver, which may measure an average of the reflected pressure pulses received in all radial directions with respect to the tool 200. The number of receivers in each of the arrays of receivers 250 and 260 may vary depending on the resolution of the measurements required by the tool 200 and/or the size of the tool 200. For instance, larger tools or tools in which higher angular resolution is required may use a larger number of sensors within the array, whereas smaller tools or tools that require a lower radial resolution may use fewer sensors. Example numbers or sensors for each of the arrays 250 and 260 on a wireline tool of typical size would be 4, 6, and 8, but other number are possible.

In certain embodiments, each receiver of the array 250 may be circumferentially aligned with a corresponding receiver of the array 260. In the embodiment shown, receiver 224 of array 250 is circumferentially aligned with receiver 226 of array 260 along line 228, which may be parallel to the longitudinal axis of the tool 200. Each of the other receivers of the arrays 250 and 260 may have similar alignments respect to the tool 200.

In the embodiment shown, the first array of receivers 250 is positioned at a first distance 230 from the transmitter 216, and the second array of receivers 260 is positioned at a second distance 232 from the transmitter 216 that is larger than the first distance 230. The distances 230 and 232 may correspond to the distances between the axial center of transmitter 216 with respect to the tool 200 and the axial centers of the arrays of receivers 250 and 260, respectively. In certain embodiments, the distance 230 may be approximately three feet and the distance 232 may be approximately five feet. The distances 230 and 232 between the arrays 250 and 260 and the transmitter 216 may affect the respective depths measured by the arrays 250 and 260. Specifically, the array 260, being farther from transmitter 216 than the array 250, may receive acoustic pulses that have penetrated more deeply into the casing 202, cement layer 208, and formation 206 than the pulses received at array 250.

In a drilling and completion operation, a drill bit may drill the borehole 204 to a certain depth and then be removed. The casing 202 then may be inserted into the borehole 204 and secured in place with the cement layer 208 following a cementing operation in which cement slurry is pumped into the annulus between the casing 202 and the formation 206. After the cement layer 208 has cured, the tool 200 may be lowered into the casing 202 by the cable 214 and, based on control signals from a surface information handling system transmitted through the cable 214 or from the electronics module 222, begin transmitting low-frequency pressure pulses from the transmitter 216. Also based on control signals from the surface information handling system or from the electronics module 222, some or all of the receivers of the arrays of receivers 250 and 260 may take periodic measurements of the reflected pressure pulses at different depth locations on the casing 202 with respect to the formation 206. The measurements from each receiver of the arrays of receivers 250 and 260 may comprise "raw" measurements that include an output value (e.g., electrical potentials in millivolts) that corresponds to the strength of the received pressure pulses at a radial orientation corresponding to the receiver. The raw measurements may then be stored and/or processed in the electronics module 222, transmitted by the electronics module 222 to a surface information handling system for processing, or some combination of the two.

The raw measurements may be processed to determine characteristics of the received pulses. Processing the raw measurements may comprise determining at least one of a signal amplitude, a signal travel time, and a total acoustic waveform for the pulses received at each receiver of the arrays 250 and 260. The low-frequency pressure pulses transmitted by the transmitter 216 may correspond to electrical signals that are tracked in a time domain. The electrical signals generated by the arrays 250 and 260 may be compared to the electrical signals of the transmitted pulses to determine at least one of a signal amplitude, a signal travel time, and a total acoustic waveform. For example, the signal travel time may comprise tracking in a time domain when the transmitted pulses are received at the receivers 218 and 220 and comparing the times of reception with the times of transmission. Additionally, the magnitude of the electrical values output from the arrays 250 and 260 may be compared to the electrical values corresponding to the transmitted pulses to determine amplitude attenuation in the received pulses. The received pulses may also be plotted over time to determine the total acoustic waveform.

When the receivers of the arrays 250 and 260 are aligned, as they are in FIG. 2, processing the measurements may further comprise comparing the raw or processed measurements from each receiver in the array 250 with the raw or processed measurements from each receiver array 260. Receiver 224, for instance, may comprise first amplitude, attenuation, travel time, and total waveform measurements, and receiver 226 may comprise second amplitude, attenuation, travel time, and total waveform measurements. One or more of the first amplitude, attenuation, travel time, and total waveform measurements may be compared to one or more corresponding second amplitude, attenuation, travel time, and total waveform measurement to determine relative amplitude, attenuation, travel time, and total waveform measurement values.

In certain embodiments, a visualization may be generated at a surface information handling system using the processed, raw, or relative measurements from arrays 250 and 260. The visualizations may present, for example, the processed or raw measurements from a particular receiver individually or may combine the processed or raw measurements from each receiver of the arrays 250 and 260. In other embodiments, a first visualization may correspond to the processed or raw measurements from the receivers of the array 250, and a second visualization may correspond to the processed or raw measurements from the receivers of the array 260. As described above, the arrays 250 and 260 may correspond to different depths of measurements, and visualizations generated using measurements from the arrays 250 and 260 correspond to different portions of the cement layer 208. For example, the measurements from the receivers of the array 250 and a resulting visualization may correspond to the cement layer 208 at or near the bond 210. Similarly, the measurements from the receivers of the array 260 and the resulting visualization may correspond to the cement layer 208 at or near the bond 212.

Figure 3A:
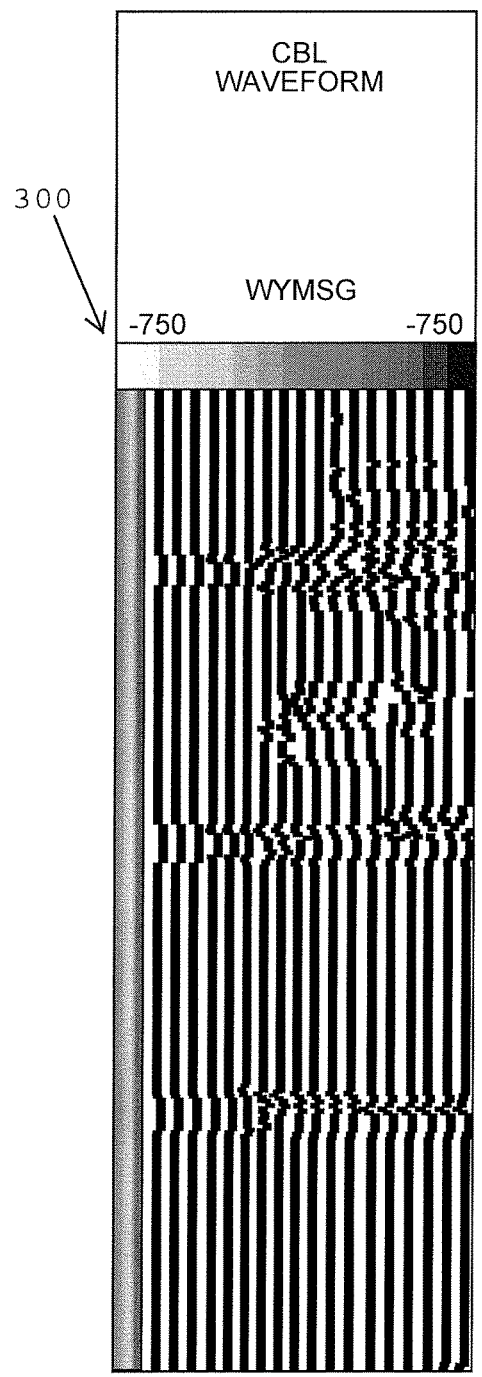
FIGS. 3A and 3B are diagrams of example measurement visualizations, according to aspects of the present disclosure.
Figure 3B:
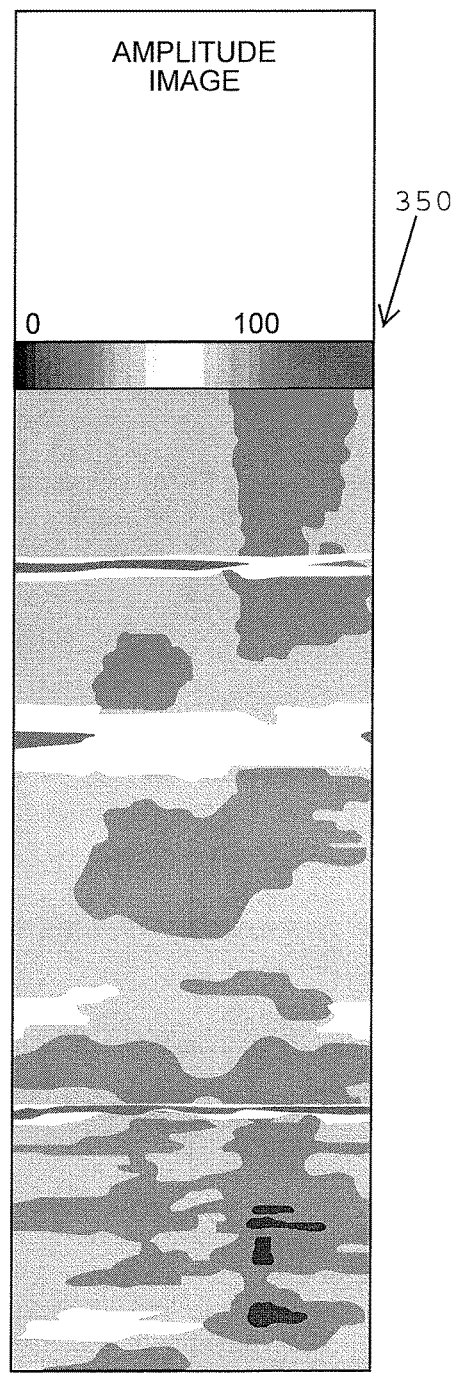

FIGS. 3A and 3B are diagrams illustrating example visualizations 300 and 350 of a cement layer in a borehole, according to aspects of the present disclosure. Specifically, visualization 300 illustrates an example cement-bond log that shows the measurements from a single receiver, and visualization 350 illustrates and radial cement-bond log type presentation that may contain composite measurements from multiple radial receivers in an array. The data presented in visualization 300 may be combined with similar data from other receivers in an array of receivers to produce the visualization 350, which plots processed or raw measurements in terms of depth on the y-axis and radial direction or azimuth on the x-axis, providing a complete log of the entire cement layer.

As can be seen, visualization 350 comprises greater resolution than is provided in the visualization 300, because it incorporates angularly specific data from multiple receivers in an array of receivers, instead of data from a single receiver. Data from a single receiver, whether an omnidirectional sensor or a single radial sensor, may be limited in that it represents only an average measurement within its range of detection. With respect to an omnidirectional receiver, the range of detection may be all angular directions surrounding the tool. Small features in the cement layer may, therefore, be averaged into the resulting measurements such that they are essentially undetectable. Using arrays of receivers and combining their measurements into a single visualization may allow for smaller features of the cement layer to be identified.

Visualizations generated using a tool with at least or array of receivers, as described above, may be used to identify characteristics of a cement layer. Specifically, local variations in the processed, raw, or relative measurements from the array of receivers may correspond to features in the cement layer that may be identified within the generated visualization. Visualization 350, for example, plots the signal amplitudes received at each receiver of an array of receivers, with the differing amplitude levels represented by color gradients, the darker areas corresponding to lower signal amplitude and the lighter areas corresponding to higher signal amplitudes. The signal amplitude levels may correspond to one or more features in the cement layer (e.g., the locations of channels or voids, cement density, cement bonding, etc.) that may be identified in the visualizations. The same or similar characteristics may be identified by visualizations of other measurements, including total waveforms, signal attenuation, and signal travel time. For example, because hardened cement dampens acoustic ringing and therefore reduces the amplitude of reflected waves, visualizations may be used to identify the liquidity, firmness, and consistency of cement. Additionally, channels or voids in the cement may appear as areas where the measured amplitude of reflected signals increase relative to the surrounding cement. Similarly, the visualizations may be used to identify sections comprising different types of cements. Specifically, cement with lead slurry will tend to have lower compressibility than "neat" cement, and thus a difference in measured amplitude response may indicate the dividing line between the two cement compositions.

In certain embodiments, multiple visualizations of a cement layer may be generated, with each layer corresponding to a different layer or locations of the cement layer. As described above with respect to FIG. 2, a first array of receivers spaced approximately three feet from a transmitter may make measurement that correspond to a portion of a cement layer at or near a first bond with a casing, and a second array of receivers spaced approximately three feet from the transmitter may make measurement that correspond to a portion of a cement layer at or near a second bond with a formation. The measurements from the first array may be used to produce a high radial-resolution visualization of the first bond, allowing characteristics of the cement layer at the first bond to be determined. The measurements from the second array may be used to produce a high radial-resolution visualization of the second bond, allowing characteristics of the cement layer at the second bond to be determined. The characteristics at the first and second bonds may, in turn, be used to characterize the strength of the first and second bonds and the overall sufficiency of the cement layer.

Because the visualization 350 identifies the portions of the cement layer with respect to a direction from the tool, the locations of features within the cement layer may be determined. To ensure that a consistent orientation is maintained during logging operations, an accelerometer or gyroscope may be coupled to or included in an electronics module of a tool to determine the orientation of the tool in the borehole, which may rotate during logging operations. In particular, the accelerometer and/or gyroscopic measurements may be used to shift the measurements from the arrays to ensure that measurements corresponding to a particular direction of the cement layer are presented in a consistent position in the visualization.

In certain embodiments, results from other types of logging tools and devices may be combined with the measurements from the arrays or receivers to characterize the cement layer, casing, or formation. For example, ultrasonic measurements may be used to collect information about the surface of the casing pipe as well as a shallow depth of information concerning the bond between the casing pipe and surrounding cement; bulk density measurements may provide information about the subterranean formation, including identification of rocks, drilling muds, gas, and other materials around the cement; and thermal neutron measurements may be used to identify hydrogen in the annulus. Results collected from those measurement techniques, as well as other measurement techniques known to those of skill in the art, may be combined with the radial CBT measurements to provide more detailed information regarding the composition of the casing, cement, and subterranean formation.

Figure 4:
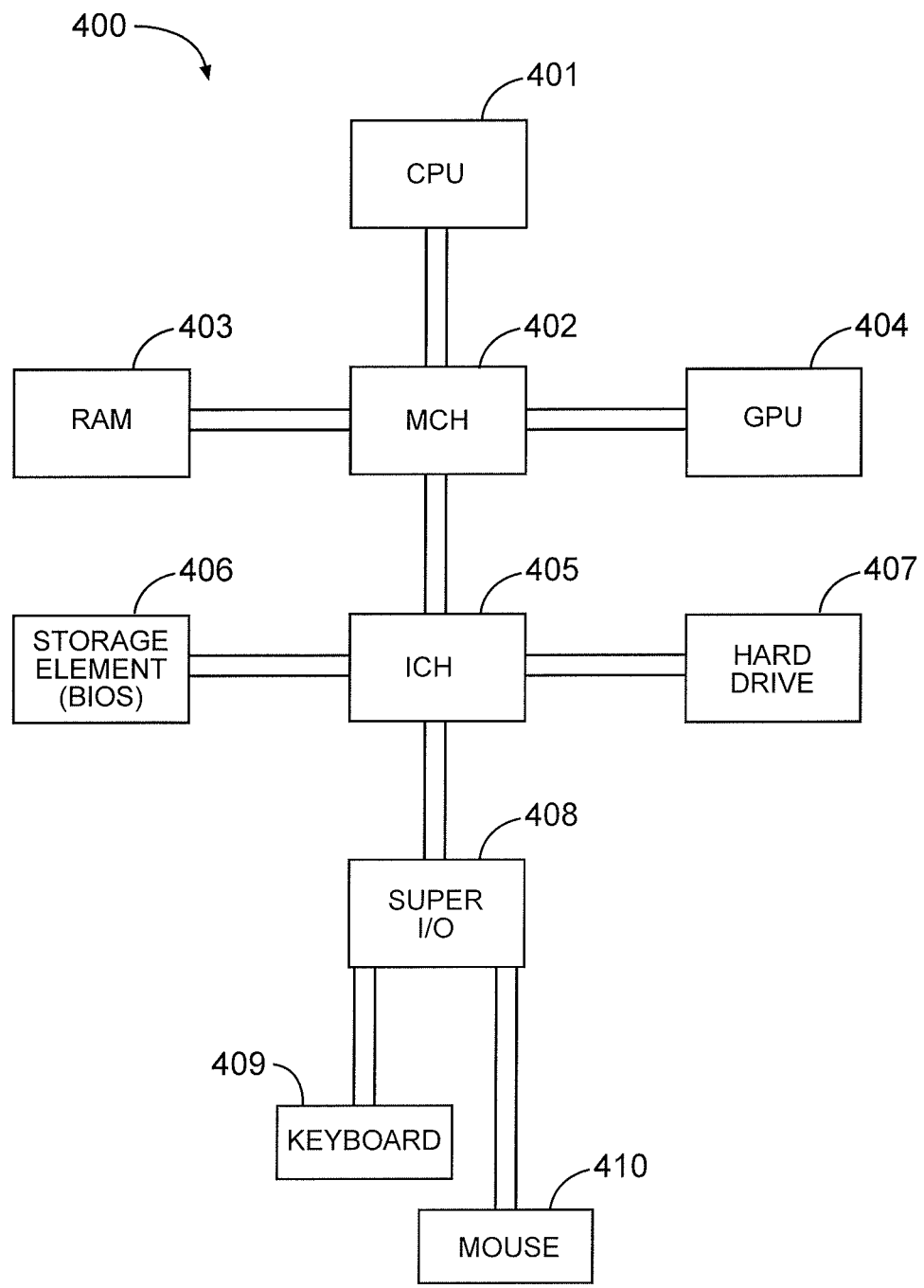
FIG. 4 is a diagram on an example information handling system, according to aspects of the present disclosure.

The processing and/or visualization steps describe above may be performed in an information handling system positioned at surface and communicable coupled to a downhole tool. FIG. 4 is a block diagram showing an example information handling system 400, according to aspects of the present disclosure. Information handling system 400 may be used, for example, as part of a logging facility. The information handling system 400 may comprise a processor or CPU 401 that is communicatively coupled to a memory controller hub or north bridge 402. Memory controller hub 402 may include a memory controller for directing information to or from various system memory components within the information handling system, such as RAM 403, storage element 406, and hard drive 407. The memory controller hub 402 may be coupled to RAM 403 and a graphics processing unit 404. Memory controller hub 402 may also be coupled to an I/O controller hub or south bridge 405. I/O hub 405 is coupled to storage elements of the computer system, including a storage element 406, which may comprise a flash ROM that includes a basic input/output system (BIOS) of the computer system. I/O hub 405 is also coupled to the hard drive 407 of the computer system. I/O hub 405 may also be coupled to a Super I/O chip 408, which is itself coupled to several of the I/O ports of the computer system, including keyboard 409 and mouse 410. The information handling system 400 further may be communicably coupled to one or more elements of a drilling system though the chip 408. The information handling system 400 may include software components that process input data and software components that generate commands or control signals based, at least in part, on the input data. As used herein, software or software components may comprise a set of instructions stored within a computer-readable medium that, when executed by a processor coupled to the computer-readable medium, cause the processor to perform certain actions.

Although the above embodiments are described with respect to wireline tools, similar embodiments may be created in logging-while-drilling and measurement-while-drilling environments. In particular, the transmitters, receivers, and arrays of receivers may be incorporated into a tool at a bottom-hole assembly (BHA) of a conventional drilling assembly. In such instances, the BHA may be lowered into a cased environment using a drill string, and measurements of the casing may be made while the BHA is passing through the casing. The measurements may be transmitted to the surface, for example, using downhole communications channels and/or telemetry systems.

According to aspects of the present disclosure, and example apparatus for downhole cement inspection may include a tool body and an acoustic transmitter coupled to the tool body. An acoustic receiver may be coupled to the tool body at a first distance from the acoustic transmitter. A first array of acoustic receivers may be coupled to and positioned around a circumference of the tool body at a second distance from the acoustic transmitter. The second distance may be greater than the first distance. The acoustic receiver may be one receiver of a second array of acoustic receivers coupled to and positioned around the circumference of the tool body at the first distance. The first distance may be approximately three feet and the second distance may be approximately five feet.

In certain embodiments, the apparatus may include an electronics module communicably coupled to the acoustic transmitter, the acoustic receiver, and the first array of acoustic receivers. The electronics module may comprise a processor and a memory device coupled to the processor, the memory device containing a set of instructions that, when executed by the processor, causes the processor to transmit from the acoustic transmitter at least one pressure pulse into a casing, cement layer, and formation in which the tool body is located; receive a first measurement from the acoustic receiver corresponding to a first bond between the casing and the cement layer; and receive a second measurement from the first array of acoustics receivers corresponding to a second bond between the cement layer and the formation.

In certain embodiments, at least one of the acoustic receiver and a receiver of the first array of acoustic receivers may comprise a piezoelectric sensor. Additionally, the acoustic receiver may be circumferentially aligned with one acoustic receiver of the first array of acoustic receivers with respect to the tool body. In certain embodiments each acoustic receiver of the second array of acoustic receivers may be circumferentially aligned with a different acoustic receiver of the first array of acoustic receivers with respect to the tool body.

According to aspects of the present disclosure, an example system for downhole cement inspection may include a tool body and an acoustic transmitter coupled to the tool body. An acoustic receiver may be coupled to the tool body at a first distance from the acoustic transmitter, and a first array of acoustic receivers may be coupled to and positioned around a circumference of the tool body at a second distance from the acoustic transmitter. The second distance is greater than the first distance. A first information handling system may be communicably coupled to the acoustic receiver and the first array of acoustic receivers. The information handling system may comprise a processor and a memory device coupled to the processor, the memory device containing a set of instruction that, when executed by the processor, causes the processor to receive a first measurement from the acoustic receiver; receive a second measurement from the first array of acoustic receivers; generate a first visualization based, at least in part, on the first measurement, the first visualization corresponding to a first bond between a downhole casing and a cement layer; generate a second visualization based, at least in part, on the second measurement, the second visualization corresponding to a second bond between the cement layer and a formation.

In certain embodiments, the acoustic receiver may comprise one of a second array of acoustic receivers coupled to and positioned around the circumference of the tool body at the first distance. The first distance may be approximately three feet and the second distance may be approximately five feet. In certain embodiments, one of the first measurement and the second measurement may correspond to a pressure pulse transmitted by the acoustic transmitter and reflected by one or more of the casing, cement layer, and formation. In certain embodiments, one of the first measurement and the second measurement may comprise at least one of an amplitude of the reflected pulse; an attenuation between transmitter pulse and the acoustic pulse; a travel time of the reflected pulse; and a waveform of the reflected pulse. In certain embodiments, the set of instructions may further cause the processor to compare the first measurement and the second measurement and generate a third visualization based, at least in part, on the comparison. Additionally, the acoustic receiver may be circumferentially aligned with one acoustic receiver of the first array of acoustic receivers with respect to the tool body.

According to aspects of the present disclosure, an example method for downhole cement inspection may include transmitting a pressure pulse from an acoustic transmitter into a downhole casing, cement layer, and formation; and measuring a first reflection of the pressure pulse at an acoustic receiver positioned a first distance from the acoustic transmitter. A second reflection of the pressure pulse may be measured at a first array of acoustic receivers positioned at a second distance from the acoustic transmitter, wherein the second distance is greater than the first distance. A first visualization may be generated based, at least in part, on the measurement of the first reflection, with the first visualization corresponding to a first bond between the downhole casing and the cement layer. A second visualization may be generated based, at least in part, on the measurement of the second reflection, with the second visualization corresponding to a second bond between the cement layer and a formation.

In certain embodiments, the acoustic receiver may comprise one of a second array of acoustic receivers positioned at the first distance. The first distance may be approximately three feet and the second distance may be approximately five feet. In certain embodiments, the method may further include measuring an orientation of acoustic receiver using an accelerometer. In certain embodiments, acoustic receiver may be circumferentially aligned with one acoustic receiver of the first array of acoustic receivers with respect to the tool body.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. An apparatus for downhole cement inspection, comprising:
   a tool body;
   an omnidirectional acoustic transmitter coupled to the tool body;
   a first array of acoustic receivers coupled to and positioned around the circumference of the tool body at a first distance from the acoustic transmitter, wherein the first array of acoustic receivers comprises a first plurality of acoustic receivers;
   a second array of acoustic receivers coupled to and positioned around a circumference of the tool body at a second distance from the acoustic transmitter, wherein the second array of acoustic receivers comprises a second plurality of acoustic receivers, wherein the second distance is greater than the first distance, wherein each acoustic receiver of the first array of acoustic receivers is at a different angular orientation, and wherein each acoustic receiver of the second array of acoustic receivers is circumferentially aligned with a different acoustic receiver of the first array of acoustic receivers with respect to the tool body; and an electronics module communicably coupled to the acoustic transmitter, the first array of acoustic receivers and the second array of acoustic receivers, wherein the electronics module comprises a processor and a memory device coupled to the processor, the memory device containing a set of instructions that, when executed by the processor, causes the processor to transmit from the acoustic transmitter one or more pressure pulses into a casing, cement layer, and formation in which the tool body is located;

receive a first measurement from the first array of acoustic receivers corresponding to a first bond between the casing and the cement layer associated with a pressure pulse of the one or more pressure pulses; and receive a second measurement from the second array of acoustic receivers corresponding to a second bond between the cement layer and the formation associated with the pressure pulse of the one or more pressure pulses.

2. The apparatus of claim 1, wherein the first distance comprises approximately three feet and the second distance comprises approximately five feet.

3. The apparatus of claim 1, wherein at least the of the second array of acoustic receivers and the first array of acoustic receivers comprises a piezoelectric sensor.

4. A system for downhole cement inspection, comprising:
a tool body;
an omnidirectional acoustic transmitter coupled to the tool body;
an acoustic receiver of a first array of acoustic receivers coupled to and positioned around the circumference of the tool body at a first distance from the acoustic transmitter, wherein the first array of acoustic receivers comprises a first plurality of acoustic receivers;
a second array of acoustic receivers coupled to and positioned around a circumference of the tool body at a second distance from the acoustic transmitter, wherein the second array of acoustic receivers comprises a second plurality of acoustic receivers, wherein the second distance is greater than the first distance, wherein each acoustic receiver of the first array of acoustic receivers is at a different angular orientation, and wherein the acoustic receiver of the second array of acoustic receivers is circumferentially aligned with a different acoustic receiver of the first array of acoustic receivers with respect to the tool body; and
a first information handling system communicably coupled to the acoustic receiver and the first array of acoustic receivers, wherein the information handling system comprises a processor and a memory device coupled to the processor, the memory device containing a set of instruction that, when executed by the processor, causes the processor to
receive a first measurement from the acoustic receiver;
receive a second measurement from the second array of acoustic receivers;
generate a first visualization based, at least in part, on the first measurement, the first visualization corresponding to a first bond between a downhole casing and a cement layer; and
generate a second visualization based, at least in part, on the second measurement, the second visualization corresponding to a second bond between the cement layer and a formation.

5. The system of claim 4, wherein the first distance comprises approximately three feet and the second distance comprises approximately five feet.

6. The system of claim 5, wherein one of the first measurement and the second measurement corresponds to a pressure pulse transmitted by the acoustic transmitter and reflected by one or more of the casing, cement layer, and formation.

7. The system of claim 6, wherein one of the first measurement and the second measurement comprises at least one of
an amplitude of the reflected pulse;
an attenuation between the transmitter pulse and the acoustic pulse;
a travel time of the reflected pulse; and
a waveform of the reflected pulse.

8. The system of claim 5, wherein the set of instructions further causes the processor to
compare the first measurement and the second measurement; and
generate a third visualization based, at least in part, on the comparison.

9. A method for downhole cement inspection, comprising:
transmitting a pressure pulse from an omnidirectional acoustic transmitter into a downhole casing, cement layer, and formation;
measuring a first reflection of the pressure pulse at an acoustic receiver of a first array of acoustic receivers positioned a first distance from the acoustic transmitter, wherein the first array of acoustic receivers comprises a first plurality of acoustic receivers;
measuring a second reflection of the pressure pulse at a second array of acoustic receivers positioned at a second distance from the acoustic transmitter, wherein the second array of acoustic receivers comprises a second plurality of acoustic receivers, wherein the second distance is greater than the first distance, wherein each acoustic receiver of the first array of acoustic receivers is at a different angular orientation, and wherein each acoustic receiver of the first array of acoustic sensors is circumferentially aligned with a different acoustic receiver of the second array of acoustic receivers with respect to the tool body;
generating a first visualization based, at least in part, on the measurement of the first reflection, the first visualization corresponding to a first bond between the downhole casing and the cement layer; and
generating a second visualization based, at least in part, on the measurement of the second reflection, the second visualization corresponding to a second bond between the cement layer and a formation.

10. The method of claim 9, wherein the first distance comprises approximately three feet and the second distance comprises approximately five feet.

11. The method of claim 9, further comprising measuring an orientation of at least one acoustic receiver of the first array of acoustic receivers using one of accelerometer and a gyroscope.

* * * * *